(12) United States Patent
Sartorius (10) Patent No.: US 11,788,514 B2
(45) Date of Patent: Oct. 17, 2023

(54) WIND POWER PLANT WITH SUPPORTING STRUCTURE

(71) Applicant: Wobben Properties GmbH, Aurich (DE)

(72) Inventor: Florian Sartorius, Leer (DE)

(73) Assignee: Wobben Properties GmbH, Aurich (DE)

( * ) Notice: Subject to any disclaimer, the term of this patent is extended or adjusted under 35 U.S.C. 154(b) by 103 days.

(21) Appl. No.: 17/311,638

(22) PCT Filed: Dec. 6, 2019

(86) PCT No.: PCT/EP2019/083962
§ 371 (c)(1),
(2) Date: Jun. 7, 2021

(87) PCT Pub. No.: WO2020/115272
PCT Pub. Date: Jun. 11, 2020

(65) Prior Publication Data
US 2022/0025872 A1    Jan. 27, 2022

(30) Foreign Application Priority Data
Dec. 7, 2018 (DE) ..................... 10 2018 131 321.7

(51) Int. Cl.
*F03D 80/70*     (2016.01)
*F03D 1/06*     (2006.01)
*F03D 80/80*     (2016.01)

(52) U.S. Cl.
CPC .......... *F03D 80/70* (2016.05); *F03D 1/0658* (2013.01); *F03D 80/88* (2016.05); *F05B 2240/50* (2013.01); *F05B 2260/79* (2013.01); *F05B 2280/10* (2013.01); *F05B 2280/20* (2013.01)

(58) Field of Classification Search
CPC ...... F03D 80/70; F03D 1/0658; F03D 7/0204; F03D 7/0208; F03D 7/021
See application file for complete search history.

(56) References Cited

U.S. PATENT DOCUMENTS

| | | | |
|---|---|---|---|
| 7,780,417 B2* | 8/2010 | Kirchner | ............... F03D 1/0658 416/207 |
| 7,874,800 B2 | 1/2011 | Kirchner et al. | |
| 9,316,204 B2* | 4/2016 | Fricke | ..................... F03D 7/022 |

(Continued)

FOREIGN PATENT DOCUMENTS

| | | |
|---|---|---|
| DE | 102007008166 A1 | 8/2008 |
| DE | 102007008167 A1 | 8/2008 |

(Continued)

*Primary Examiner* — Justin D Seabe
(74) *Attorney, Agent, or Firm* — SEED INTELLECTUAL PROPERTY LAW GROUP LLP (57) ABSTRACT

A wind power plant comprising a first structural element, a second structural element, a bearing assembly by means of which the first structural element is rotatably mounted on the second structural element, a first flange connection between the first structural element and the bearing assembly, a second flange connection between the second structural element and the bearing assembly, and at least one drive, held by a support structure for rotating the first structural element relative to the second structural element. The support structure is formed as a plate and is arranged at one of the flange connections.

17 Claims, 5 Drawing Sheets

(56) References Cited

U.S. PATENT DOCUMENTS

| | | | | |
|---|---|---|---|---|
| 9,915,245 B2* | 3/2018 | Kosuri | ................... | F16C 19/28 |
| 10,947,958 B2* | 3/2021 | Eusterbarkey | ........ | F16H 57/082 |
| 2019/0360459 A1 | 11/2019 | Müller et al. | | |

FOREIGN PATENT DOCUMENTS

| | | | |
|---|---|---|---|
| DE | 102007009575 A1 | | 8/2008 |
| DE | 102011113372 A1 | | 3/2013 |
| EP | 3242013 A1 | | 11/2017 |
| WO | 2017/005264 A1 | | 1/2017 |
| WO | 2017/084755 A2 | | 5/2017 |
| WO | WO-2019215466 A1 | * | 11/2019 |

* cited by examiner

WIND POWER PLANT WITH SUPPORTING STRUCTURE

BACKGROUND

Technical Field

The invention relates to a wind power plant.

Description of the Related Art

In the priority-establishing German application 10 2018 131 321.7, the German Patent and Trade Mark Office has searched the following prior art: DE 10 2007 008 166 A1, DE 10 2007 008 167 A1, DE 10 2007 009 575 A1 and WO 2017/005 264 A1.

Wind power plants are well known. They are used to generate electrical energy. They usually have a tower on which a nacelle is rotatably supported, the nacelle being operatively connected to a rotor of the wind power plant. The dominant design of wind power plants is the three-bladed horizontal-axis wind power plant, in which the rotor is located on the windward side during operation and its nacelle is actively tracked according to the wind direction, in particular by means of a yaw drive. It is also usual for the rotor blades to be rotatable about their longitudinal axis by means of a pitch drive.

Also generally known is the use of gearwheel arrangements for slewing rings in the case of wind power plants at the points where structural elements are moved rotationally relative to each other and in particular where a transmission from a first rotating structural element to a second rotating structural element is to be formed. A pitch drive or yaw drive in this case has a drive that usually drives a drive shaft via a gearbox. The drive in this case is fast-rotating with low torque, and the drive shaft is slow-rotating with high torque. The high torque is then transmitted from the drive shaft via its pinion, i.e. a small gearwheel, to a large gearwheel in the region of a rotor-blade root, in order to adjust the rotor blade, or in the region of a transition between the tower and the nacelle, in order to adjust the nacelle. For example, along its outer circumference the rotor-blade root has an external toothing, which then forms the gearwheel in which the pinion of the gearbox engages. A high driving torque is transmitted in this case for the purpose of blade pitch control, or yaw control.

The support structures for the pitch drive and the yaw drive known from the prior art are mostly solid integral cast constructions, since for the purpose of blade pitch control, or yaw control, a high driving torque is transmitted, which results in high loads on the mechanical components involved. For example, the yaw drives are mostly arranged on casings that are recessed in the support structure, which connects the bearing assembly and the nacelle to the tower, or the main carrier. The mounts, known from the prior art, for the pitch drives are mostly cast onto the rotor hub or onto an adapter plate provided for receiving the bearing assembly and the gearwheel. Due to their complexity and structural element weight, these cast constructions result in considerable production, transport and assembly costs.

Especially in the case of gearless wind power plants that have slowly rotating multipole synchronous generators, the generators, and thus the nacelles, of the wind power plants are very large. It is therefore advantageous, especially in the case of gearless wind power plants, to provide a compact design in order to reduce the high transport and assembly costs due to the dimensioning of the structural elements.

In the wind power plant sector there is a steadily increasing cost pressure. As a result, more cost-efficient constructions and more compact designs are being sought.

BRIEF SUMMARY

Provided is a support structure that, in some embodiments, overcomes the disadvantages described above. In particular, a solution should be found which provides for a reduction of the weight and the associated transport and assembly costs, or the production costs.

One embodiment is directed to a wind power plant comprising a first structural element, a second structural element, a bearing assembly by means of which the first structural element is rotatably supported on the second structural element, a first flange connection between the first structural element and the bearing assembly, a second flange connection between the second structural element and the bearing assembly, and at least one drive, held by a support structure, for rotating the first structural element relative to the second structural element.

In the case of wind power plants of the type described at the outset, the support structure be plate-shaped and be arranged at one of the flange connections.

A plate is understood here as structural elements whose thickness is very small in relation to their base area, preferably less than 200 mm (millimeters), particularly preferably up to 100 mm. The plate is preferably flat.

Realization of the support structure as a plate reduces the production depth and thus the production costs of the support structure. The fastening of the support structure to one of the flange connections offers a compact design with, at the same time, simple fastening of the support structure, and thus enables a reduction of the installation space.

The support structure is preferably arranged on the main carrier in the nacelle or on the rotor hub, adjacent to the generator. The resulting compact design makes it possible to dispense with long cable runs and, in particular, complex contacting.

According to an advantageous further development, there is a gearwheel assigned to one of the structural elements, and the drive has at least one driving pinion that is operatively connected to the gearwheel.

Further preferably, the support structure has a plurality of openings in a predetermined pattern, and the structural element and the bearing assembly of the flange connection corresponding to the support structure further have corresponding openings in the same pattern, wherein the openings are adapted for the lead-through of connection means, in particular bolts, by means of which the support structure can be connected to the flange connection. Thus, a functional and easily manageable connection between the support structure, the bearing assembly and one of the flange connections is proposed. Moreover, this connection does not require any additional installation space and can be implemented in a cost-efficient manner. Most importantly, all structural elements can be assembled in one assembly operation by use of the same fastening means, which increases assembly efficiency.

For example, existing installation space on the outer circumference of the tower or of the rotor blade may also be used to arrange the gearwheel there and to bring the drives into engagement with it.

The arrangement of the support structure for the drive on the second flange connection is advantageous, in particular, in the case of small gearwheel diameters. In the case of small gearwheel diameters, the drives are heavy in comparison with the gearwheel, such that the arrangement of the gearwheel on the rotatably mounted structural element saves weight, and the necessary driving power selected can thus be lower.

According to an advantageous further development, the bearing assembly comprises a bearing ring, and the plurality of openings of the bearing assembly are formed on the bearing ring. The corresponding openings in the bearing ring enable a compact design by utilizing the already existing openings for connecting the bearing assembly to a first or second structural element by means of a first or second flange connection.

Particularly preferably, the support structure has a first number of installation mounts for the drives, and a second number of drives is mounted in the mounts, wherein the first number is greater than the second number. Thus, the positioning of the drives on the support structure can be varied over time, thereby counteracting premature wear of the mechanical components, and in particular the gearwheels, that are operatively connected to the drive. The maintenance effort is reduced by the possibility of varying the positioning of the drives and the service life of the system is increased.

According to a preferred embodiment, the support structure is arranged adjacent to the gearwheel, preferably between the gearwheel and the flange connection assigned to the gearwheel. Such an arrangement of the support structure increases the clamping length of the connection means between the gearwheel and the flange connection, and thus the force that can be transmitted.

According to an advantageous embodiment, the support structure is made of glass-fiber-reinforced plastic and/or carbon-fiber-reinforced plastic, and the mounts and/or openings are preferably reinforced with metal. This further reduces the weight of the support structure, and thus of the nacelle of the wind power plant. Realization of the plate from a fiber-reinforced plastic makes it possible to achieve a design that is compatible in respect of load-path, and the metallic reinforcement of the mounts avoids the so-called bearing stress failure due to forces acting in the circumferential direction. Local reinforcement and design of the support structure that is optimized in respect of load path can significantly reduce the weight, and thus the transport and assembly costs.

According to a further advantageous embodiment, the support structure is made of a metallic material, wherein the metallic material is preferably hardened, particularly preferably surface-hardened, at the mounts and/or openings. The mounts for the drives, which are formed on the support structure, are subjected on the one hand to the weight forces of the drives in the vertical direction, which result in a bending load. On the other hand, there are loads acting in the circumferential direction due to the inertia of the structural element to be rotated. Since the loads acting in the circumferential direction due to the inertia of the structural element to be rotated are usually significantly greater, an increase in strength increases the service life of the support structure and avoids over-dimensioning in regions subjected to only low mechanical stress.

Preferably, the support structure has a thickness of 100 mm or less, in particular of from 10 mm to 100 mm. Since the support structure is subjected in particular to forces in the circumferential direction, such a configuration of the thickness of the plate is functional for the respective load condition and avoids over-dimensioning and the undesirable increase in weight.

The support structure is advantageously formed in one piece and has a cylindrical opening that is coaxial with the bearing ring and/or the gearwheel. Thus, the production effort is reduced by use of a one-piece plate as a support structure for the drives. The weight of the support structure is further reduced by the realization of an opening arranged coaxially with the bearing ring and/or the gearwheel. This design is particularly advantageous in the case of a support structure for receiving yaw drives that rotate the nacelle of the wind power plant relative to the tower. The opening allows access to the nacelle through the tower, which preferably has a transport lift or comparable facilities.

According to another preferred embodiment, the support structure is made up of a plurality of segment parts, each of which extends coaxially over part of the circumference. In this way, the transport effort is reduced considerably, in particular in the case of large wind power plants, and the costs can thus be lowered. The segment parts thus form a cylindrical opening that is arranged coaxially with the bearing ring and/or the gearwheel. With regard to the advantages of a cylindrical opening, reference is made to the remarks above.

Particularly preferably, the support structure has at least one first segment part respectively comprising the at least one mount for the drives, and the support structure further has at least one second segment part, wherein the first segment part is preferably made of a high-strength material. Thus, a weight and cost reduction of the support structure can be achieved by the functional division of the segment parts of the support structure, in particular by the distribution of the drives to the first segment parts, and a load-appropriate selection of material.

According to a particularly preferred embodiment, the first structural element is a main carrier, arranged in the nacelle, of a wind power plant, the second structural element is a tower of a wind power plant, the bearing assembly is a yaw bearing assembly, and the drive is a yaw drive. It is thus possible to dispense with the yaw drive casings, known from the prior art, that are cast onto the main carrier. The production of the main carrier is facilitated by the reduced complexity of the casting, and thus the production costs are reduced. Moreover, the transport and assembly costs can be further reduced due to the reduced weight of the main carrier.

The arrangement of the support structure between the bearing assembly and the first, or second, structural element is particularly advantageous, as the required installation space is reduced considerably due to the low structural-element height of the flat plate, and the nacelle can be designed more compactly.

According to a further advantageous embodiment, the first structural element is a rotor blade, the second structural element is a rotor hub arranged on the nacelle, the bearing assembly is a pitch bearing assembly, and the drive is a pitch drive. The support structure for a drive, in this case a pitch drive, thus also makes use here of the advantages described above. The reduction in the weight of the support structure for the pitch drives also affects the weight of the rotary assembly coupled to the rotor, and the associated reduction in weight increases the yield of electrical energy and reduces the loads acting on the main carrier and the axle journal.

BRIEF DESCRIPTION OF THE SEVERAL VIEWS OF THE DRAWINGS

The invention is explained in greater detail in the following on the basis of exemplary embodiments, with reference to the appended figures. There are shown.

DETAILED DESCRIPTION

Figure 1:
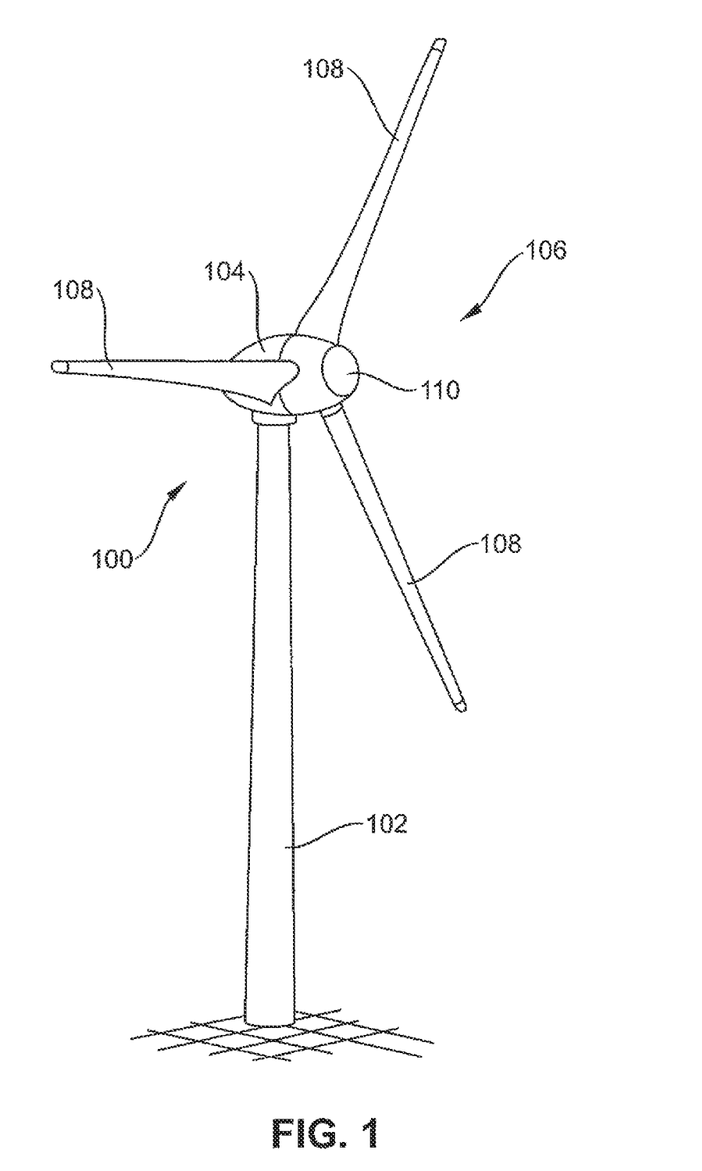
FIG. 1 is a schematic perspective view of a wind power plant.

FIG. 1 shows a wind power plant 100 having a tower 102 and a nacelle 104. Arranged on the nacelle 104 there is a rotor 106 that has three rotor blades 108 and a spinner. When in operation, the rotor 106 is put into a rotating motion by the wind, and thereby drives a generator (not shown) in the nacelle 104.

The rotor blades 108 are operatively connected to a rotor hub 112. The rotor hub 112 is rotatably mounted on the nacelle 104. The nacelle 104 is rotatably mounted on the tower 102 by means of a yaw drive 122. The rotor blades 108 are rotatably mounted on the rotor hub 110 at their rotor blade root by means of a pitch drive 122'.

Figure 2:
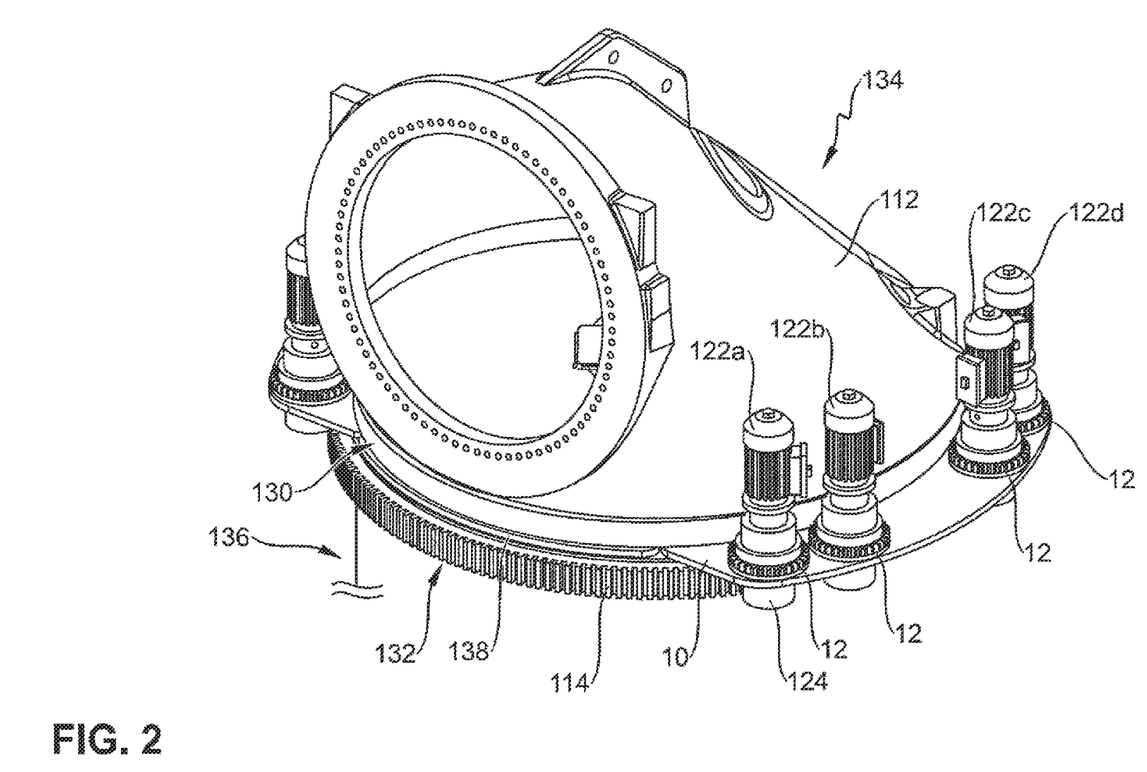
FIG. 2 is an embodiment of the support structure for receiving a yaw drive, in a perspective view.
Figure 3:
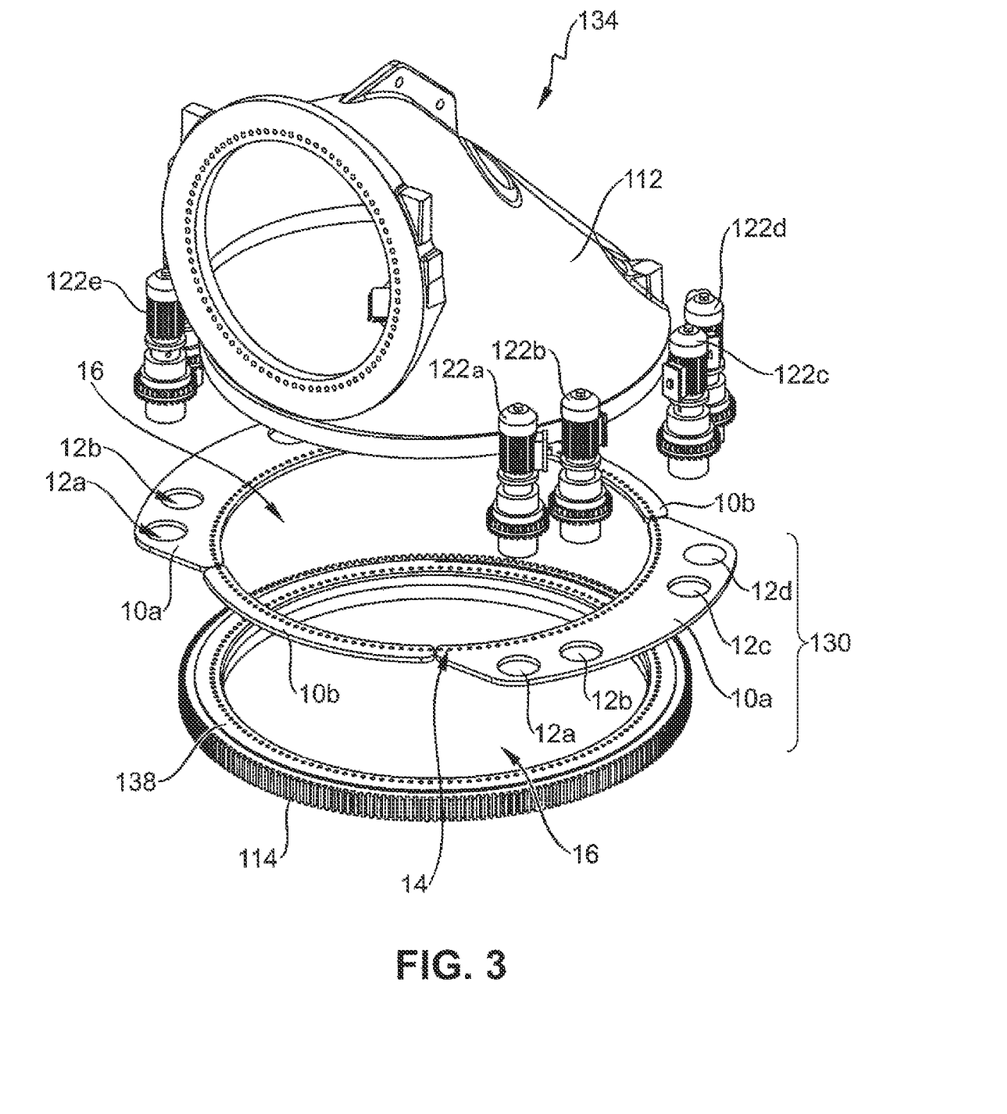
FIG. 3 is an embodiment of the support structure for receiving a yaw drive, in an exploded representation.

FIGS. 2 and 3 show an embodiment of the wind power plant 100 comprising a first structural element 134, in this case the nacelle 104, a second structural element 136, in this case the tower 102 (FIG. 1) and a yaw bearing assembly 138. By means of the yaw bearing assembly 138, the first structural element 134 is rotatably mounted on the second structural element 136 and can be driven by means of a yaw drive 122.

There is a first flange connection 130 formed between the nacelle 104, in particular the main carrier 112 arranged in the nacelle 104, and the bearing assembly 138. There is a second flange connection 132 formed between the tower 102 and the bearing assembly 138. There is a support structure 10, formed as a plate, arranged at the first flange connection 130. The drives 122 are mounted on a support structure 10.

The bearing assembly 138 has a bearing ring 138 (FIG. 3). There is a gearwheel 114 mounted in a rotatable manner on the bearing ring 138. The gearwheel 114 is mechanically connected to the tower 102 of the wind power plant 100.

The yaw drives 122 are attached to the support structure 10 in such a manner that a driving pinion 124, formed on the tower side of the respective yaw drive 122, is operatively connected to the gearwheel 114. The driving pinion 124 is driven by means of the yaw drives 122.

As shown by the exploded representation according to FIG. 3, the support structure 10 is segmented. The segment parts 10a, 10b have mounts 12 for the yaw drives 122. In the exemplary embodiment shown, there is a recess 12 provided for each drive motor. In an alternative, not shown, it is envisaged to provide more mounts 12 than motors 122 in the support structure 10. This would allow the motors 122 to be replaced after reaching a predetermined service life and would allow the bearing ring 138 to have a longer service life.

The bearing ring 138 has, along its circumference, a plurality of corresponding openings 118, through which connection means can be led in order to connect the bearing ring 138 to the main carrier 112. The support structure 10 arranged at the first flange connection 130 between the bearing ring 138 and the main carrier 112 has a plurality of corresponding openings 14 through which connecting means can also be led in order to connect the bearing ring 138, the support structure 10 and the main carrier 112 to each other. The pattern of the openings 118 corresponds to the pattern of the corresponding openings 14 of the support structure 10.

The support structure 10 has a cylindrical recess 16 that is coaxial with the bearing ring 138 and the gearwheel 114.

The drives 122a, 122b and 122c, 122d are arranged adjacent to each other on a first segment part 10a of the support structure 10 and mounted on the mounts 12a, 12b, 12c, 12d. The yaw drives 122e, 122f, as well as 122g, 122h, are arranged opposite each other on a further first segment part 10a of the support structure 10 and are mounted on the mounts 12a, 12b, 12c, 12d at a distance from each other. The second segment parts 10b of the support structure 10 are arranged opposite each other and are narrower than the first segment parts 10a, and they do not have mounts for yaw drives 122. The segment parts 10a, 10b are arranged adjacent to each other and realize a recess 16 that is coaxial with the bearing ring 138 and the gearwheel 114.

Figure 4:
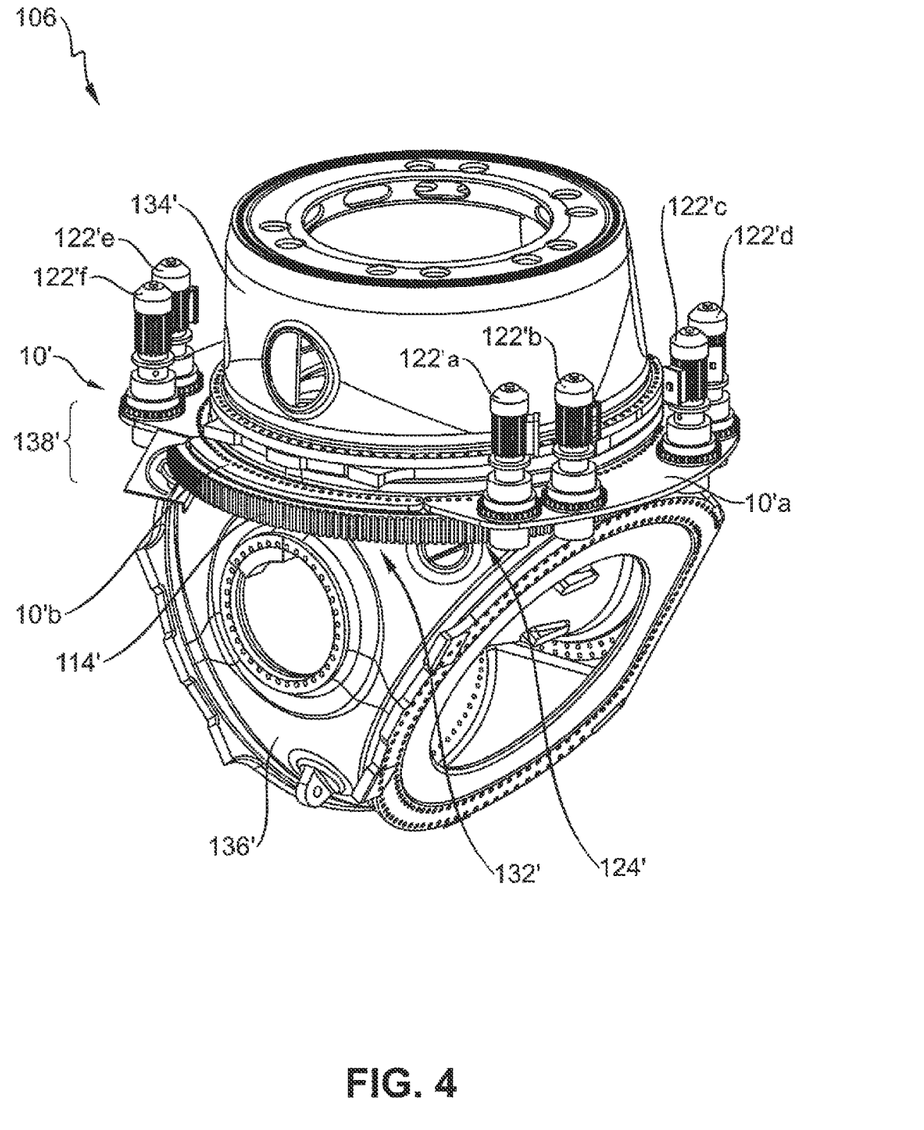
FIG. 4 is an embodiment of the support structure for receiving a pitch drive, in an exploded view.

FIG. 4 shows an alternative embodiment of the wind power plant 100 according to the invention, having a first structural element 134', here respectively a rotor blade or an intermediate piece for attaching a rotor blade, a second structural element 136', in this case the rotor hub, and a pitch bearing assembly 138'. By means of the pitch bearing assembly 138', the first structural element 134' is rotatably mounted on the second structural element 136' and can be driven by means of one or more pitch drives 122'a, 122'b, 122'c, 122'd, 122'e, 122'f. The drives 122'a, 122'b, 122'c, 122'd, 122'e, 122'f are mounted on a support structure 10'a, 10'b.

The support structure 10'a, 10'b is preferably attached to the first structural element 134'. The bearing assembly 138' has a bearing ring. There is a gearwheel 114' mounted in a rotatable manner on the bearing ring. The gearwheel 114' is preferably mechanically connected to the hub 136' of the wind power plant. The pitch drives 122' are attached to the support structure 10' in such a manner that a driving pinion 124', formed on the rotor-blade side of the respective pitch drive 122', is operatively connected to the gearwheel 114'. The driving pinion 124' is preferably driven by means of the pitch drives 122'.

With regard to the basic mode of operation, reference is made to FIGS. 1 to 3, which show the same functional principle.

The drives 122'a, 122'b and 122'c, 122'd are arranged adjacent to each other on a first segment part 10'a of the support structure 10' and mounted on the mounts 12a, 12b, 12c, 12d. The pitch drives 122'e, 122'f, as well as 122'g, 122'h, are arranged opposite each other on a further first segment part 10'a of the support structure 10' and are mounted on the mounts 12'a, 12'b, 12'c, 12'd at a distance from each other. The second segment parts 10'b of the support structure 10' are arranged opposite each other and are narrower than the first segment parts 10'a, and they do not have mounts for pitch drives 122'. The segment parts 10'a, 10'b are arranged adjacent to each other along an inner circumference that is coaxial with the bearing ring 138' and the gearwheel 114'.

Figure 5:
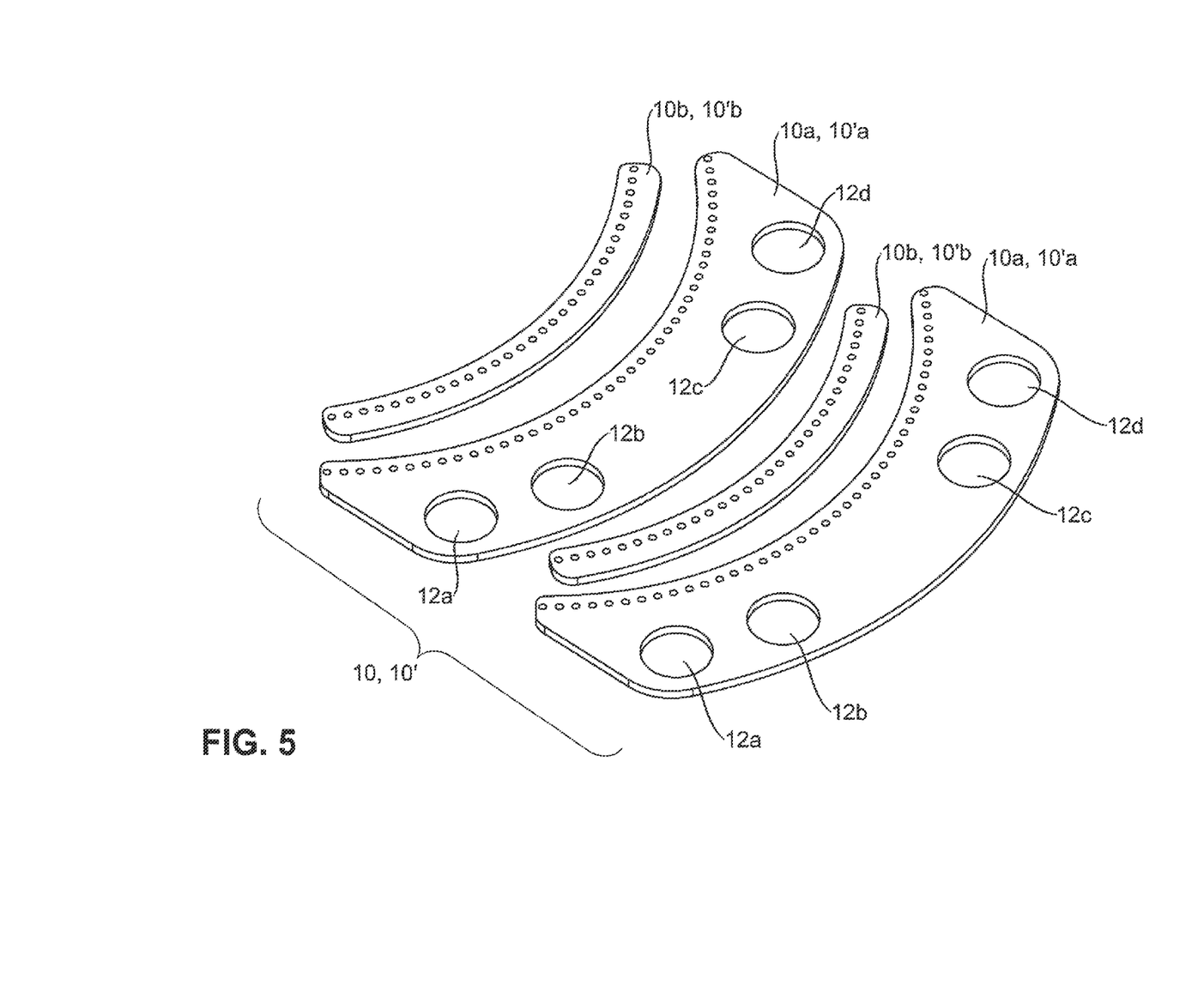
FIG. 5 is a detailed view of the support structure.

As shown by FIG. 5, the segment parts 10a, 10b, 10'a, 10'b of the support structure 10, 10' can be stored and stacked in a space-saving manner due to the segmentation. Preferably, a first pair of congruent segment parts 10a, 10'a and a second pair of congruent segment parts 10b, 10'b are respectively provided in order to reduce the variety of parts.

REFERENCES 10, 10' support structure
10a, 10b, 10'a, 10'b segment parts 12a, 12b, 12c, 12d, 12'a, 12'b, 12'c, 12'd mounts
14, 14' opening
16, 16' recess
100 wind power plant
102 tower
104 nacelle
106 rotor
108 rotor blades
110 rotor hub
112 main carrier
114, 114' gearwheel
118, 118' openings
122a, 122b, 122c, 122d, 122e, 122f yaw drives
122'a, 122'b, 122'c, 122'd, 122'e, 122'f pitch drives
124, 124' driving pinion
130, 130' first flange connection
132, 132' second flange connection
134, 134' first structural element
136, 136' second structural element
138, 138' bearing assembly, bearing ring

The invention claimed is:

1. A wind power plant comprising:
a first structural element,
a second structural element,
a bearing assembly, wherein the first structural element is rotatably mounted on the second structural element by the bearing assembly,
a first flange connection between the first structural element and the bearing assembly,
a second flange connection between the second structural element and the bearing assembly, and
at least one drive held by a support structure, the at least one drive configured to rotate the first structural element relative to the second structural element,
wherein the support structure is plate-shaped and arranged at one of the first or second flange connections,
wherein the support structure comprises a plurality of segment parts that each extend coaxially over part of a circumference of the support structure, wherein the plurality of segment parts includes a first segment part and a second segment part, wherein the first segment part has at least one mount for the at least one drive, and wherein the second segment part does not include a mount.

2. The wind power plant as claimed in claim 1, wherein a gearwheel is assigned to one of the structural elements, and wherein the drive has at least one driving pinion that is operatively connected to the gearwheel.

3. The wind power plant as claimed in claim 2, wherein the support structure is arranged adjacent to the gearwheel.

4. The wind power plant as claimed in claim 3, wherein the support structure is arranged adjacent to the gearwheel at the first flange connection.

5. The wind power plant as claimed in claim 1, wherein the support structure has a plurality of openings in a predetermined pattern, and wherein the bearing assembly of the flange connection corresponding to the support structure has corresponding openings in a same pattern, wherein the plurality of openings configured to receive connectors configured to couple the support structure to the flange connection.

6. The wind power plant as claimed in claim 1, wherein the bearing assembly comprises a bearing ring, and wherein a plurality of openings of the bearing assembly are formed on the bearing ring.

7. The wind power plant as claimed in claim 1, wherein the support structure has a first number of installation mounts, and wherein a second number of drives is mounted in the installation mounts, respectively, wherein the first number is greater than the second number.

8. The wind power plant as claimed in claim 7, wherein the installation mounts or a plurality of openings in the support structure are reinforced with metal.

9. The wind power plant as claimed in claim 1, wherein the support structure is made of plastic and comprising at least one type of fibers chosen from glass-fibers and carbon-fibers.

10. The wind power plant as claimed in claim 1, wherein the support structure is made of a metallic material.

11. The wind power plant as claimed in claim 1, wherein the support structure has a thickness of 100 millimeters (mm) or less.

12. The wind power plant as claimed in claim 11, wherein the support structure has a thickness from between 10 mm to 100 mm.

13. The wind power plant as claimed in claim 1, wherein the at least one mount includes metallic material.

14. The wind power plant as claimed in claim 1, comprising a nacelle and a tower, wherein the first structural element is a main carrier arranged in the nacelle, wherein the second structural element is the tower, wherein the bearing assembly is a yaw bearing assembly, and wherein the drive is a yaw drive.

15. The wind power plant as claimed in claim 1, wherein the first structural element is a rotor blade, wherein the second structural element is a rotor hub arranged on a nacelle, wherein the bearing assembly is a pitch bearing assembly, and wherein the drive is a pitch drive.

16. The wind power plant as claimed in claim 1, wherein the support structure has a substantially cylindrical opening that is coaxial with at least one of a bearing ring and a gearwheel.

17. The wind power plant as claimed in claim 1, wherein the installation mounts are made of a hardened metallic material.

* * * * *